United States Patent [19]

Termath

[11] Patent Number: 5,271,994
[45] Date of Patent: Dec. 21, 1993

[54] ELECTRICALLY HEATABLE AUTOMOBILE GLAZING OF LAMINATED GLASS

[75] Inventor: Gunter Termath, Gelsenkirchen, Fed. Rep. of Germany

[73] Assignee: Saint Gobain Vitrage International, Courbevoie, France

[21] Appl. No.: 623,859

[22] Filed: Dec. 7, 1990

[30] Foreign Application Priority Data

Dec. 9, 1989 [DE] Fed. Rep. of Germany ....... 3940748

[51] Int. Cl.$^5$ ................................................. B32B 7/02
[52] U.S. Cl. ................................... 428/216; 428/31;
428/432; 428/434; 428/437; 428/469; 428/699
[58] Field of Search .................. 428/31, 216, 432, 434,
428/437, 469, 699, 621, 622, 632, 631, 642;
359/360, 548, 549, 585; 55/60.2, 60.4; 296/84.1

[56] References Cited

U.S. PATENT DOCUMENTS

| | | |
|---|---|---|
| 3,274,024 | 9/1966 | Hill et al. ............................. 428/433 |
| 3,826,728 | 7/1974 | Chambers et al. .................... 428/433 |
| 3,878,079 | 4/1975 | Schauer ................................ 204/192 |
| 3,889,026 | 6/1975 | Groth .................................... 428/34 |
| 4,045,125 | 8/1977 | Farges ................................... 359/360 |
| 4,322,276 | 3/1982 | Meckel et al. ........................ 428/472 |
| 4,368,945 | 1/1983 | Fujimori et al. ...................... 350/1.7 |
| 4,465,736 | 8/1984 | Nishihara et al. .................... 428/332 |
| 4,654,067 | 3/1987 | Ramus et al. ......................... 65/60.5 |
| 4,668,270 | 5/1987 | Ramus .................................. 65/106 |
| 4,702,955 | 10/1987 | Allred et al. ......................... 428/701 |
| 4,710,426 | 12/1987 | Stephens .............................. 428/336 |
| 4,744,844 | 5/1988 | Hurst .................................... 156/101 |
| 4,749,397 | 6/1988 | Chesworth et al. .................. 65/60.4 |
| 4,773,717 | 9/1988 | Pai et al. ............................... 359/580 |
| 4,782,216 | 11/1988 | Woodard .............................. 219/547 |
| 4,799,745 | 1/1989 | Meyer et al. ......................... 350/1.7 |
| 4,943,140 | 7/1990 | Woodard et al. .................... 350/164 |
| 4,943,484 | 6/1990 | Goodman ............................ 428/441 |
| 4,973,511 | 11/1990 | Farmer et al. ....................... 428/216 |
| 5,061,567 | 10/1991 | Brochot et al. ..................... 428/216 |
| 5,061,568 | 10/1991 | Kessel et al. ........................ 428/437 |
| 5,085,926 | 2/1992 | Iida et al. ............................. 359/359 |

FOREIGN PATENT DOCUMENTS

| | | |
|---|---|---|
| 0104870 | 9/1983 | European Pat. Off. . |
| 0263623 | 9/1987 | European Pat. Off. . |
| 62-123403 | 6/1987 | Japan . |
| 63-242948 | 10/1988 | Japan . |
| WO88/01230 | 2/1988 | PCT Int'l Appl. . |

Primary Examiner—Paul J. Thibodeau
Assistant Examiner—H. Thi Le
Attorney, Agent, or Firm—Pennie & Edmonds

[57] ABSTRACT

An electrically heatable laminated glazing system is disclosed comprising two single glass panes (1,4) bonded together by a thermoplastic film of polyvinyl butyral (3). One of these two panes (1) bears a layered construction (2). The layered construction comprises a conducting silver layer (22), an anti-reflective cover layer (23) of zinc oxide disposed on the silver layer (22), and a bonding layer (24) utilized to improve a bond between the polyvinyl butyral film (3) and the anti-reflective covering layer (23). The bonding layer comprises one of the metals in groups IV, V, or VII of the periodic system or an oxide of these metals.

12 Claims, 1 Drawing Sheet

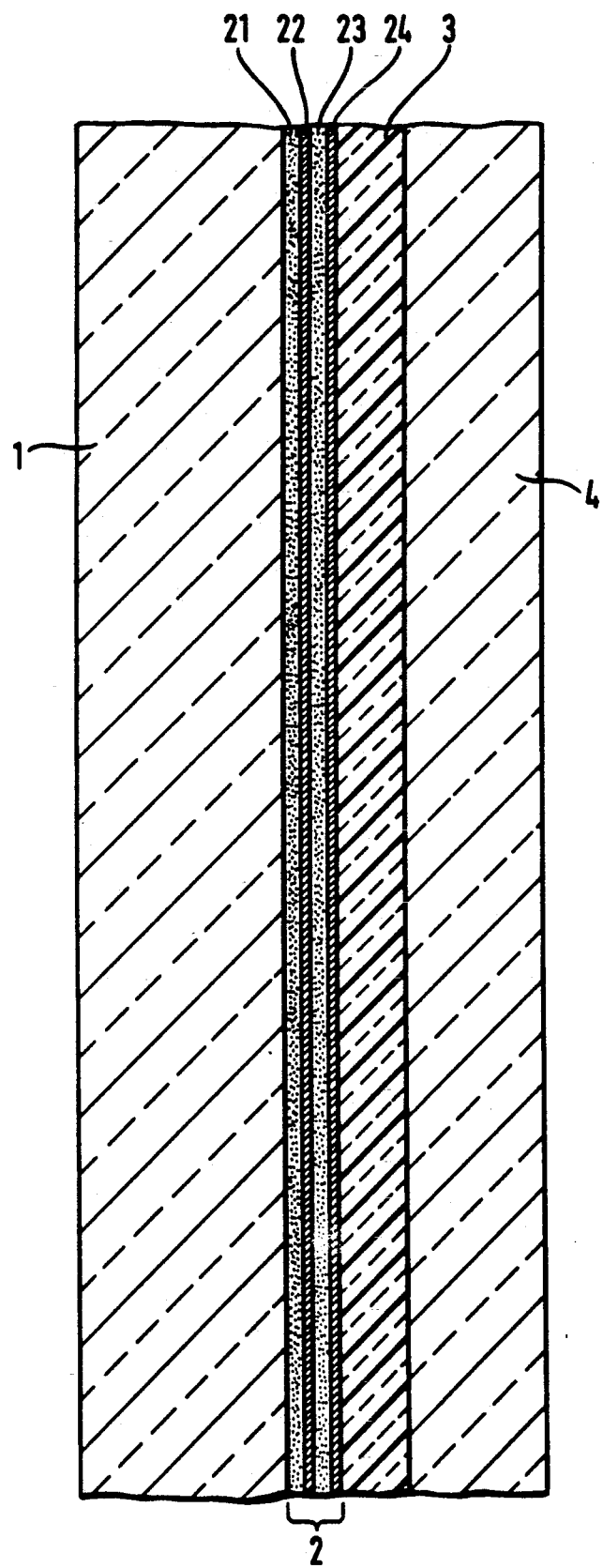

ELECTRICALLY HEATABLE AUTOMOBILE GLAZING OF LAMINATED GLASS

BACKGROUND OF THE INVENTION

This invention relates to an electrically heatable laminated glazing, especially an automobile glazing.

The simplest laminated glazing includes two glass panes bonded together with a thermoplastic film of a material such as polyvinyl butyral which has excellent bonding properties. To provide an electrically heatable laminated glazing U.S. Pat. Nos. 4,654,067, 4,668,270, and 4,744,844, describe such a laminated glazing which further includes a layered construction positioned between one of the glass panes and the thermoplastic film comprising an anti-reflective layer of zinc oxide and a conductive silver layer disposed on the zinc oxide layer. Optionally, an additional anti-reflective layer of zinc oxide is disposed on the silver layer, forming a zinc oxide-silver-zinc-oxide construction, which is again positioned between one of the glass panes and the thermoplastic film. This layered construction is applied to the glass with magnetic field-supported cathode sputtering or magnetic field-supported reactive cathode sputtering.

Also known to the prior art is the use of additional layers in the layered construction including a thin layer of metal or an under-oxidized (i.e., substoichiometric) metal oxide disposed between the silver layer and the anti-reflective covering layer, as disclosed in European Patent No. 0 104 870. The purpose of the thin metallic layer is to protect the silver layer from the influence of oxygen during the cathode sputtering of the anti-reflective covering layer.

European Patent No. 0 263 623 discloses a laminated glazing including a layer for improving the bond to the polyvinyl butyral film disposed on the anti-reflective covering layer of zinc oxide. In this known heatable laminated glazing, a layer of chromium oxide is provided to improve the bond, wherein the chromium oxide layer has a thickness of approximately 25 to 100 Angstroms, and consists of a mixture of metallic chromium and chromium oxides of varying degrees of oxidation (i.e., CrO, $CrO_2$, $CrO_3$, and $Cr_2O_3$). This uppermost layer of chromium oxide is intended to solve the well-known problem of deterioration of the bond between the surface coating and the polyvinyl butyral film over the course of time and under the influence of UV radiation. In some instances, the deterioration can advance such that the required safety properties of the laminated glazing are jeopardized.

SUMMARY OF THE INVENTION

The objective of the present invention is to provide a laminated glass pane including a layer for improving the bond between the anti-reflective zinc oxide layer and the polyvinyl butyral film. Such bond-improving layers have properties equal to or better than those of the known bond-improving layers of chromium oxide and can be applied without difficulty by the method of cathode sputtering.

According to the present invention, this objective is achieved by including in the layered construction a bond-improving layer consisting of one of the metals of groups IV, V or VIII of the periodic system, or of an oxide of one of these metals. It has been found that such bond-improving layers provide a bond strength between the anti-reflective coating of zinc oxide and the polyvinyl butyral film that corresponds to the bond strength found between an uncoated glass surface and the polyvinyl butyral film.

While the bond improving layers act to improve the bond strength, metal coatings utilized in these layers can have an adverse influence upon the light transmission and light reflection of the glazing. Therefore, it is advisable to limit the metal layer thickness to the order of 10 to 30 Angstroms to avoid an adverse distortion of the desired optical properties of the glazing (i.e., light transmission, and intensity and spectral distribution of a reflected component of incident light).

Since layers of metal oxide have a substantially greater transparency than layers of metal, the bond-improving layers may have a greater thickness to the extent to which their degree of oxidation increases. Metal oxide layers in which the metal is fully oxidized throughout, that is to say is stoichiometrically oxidized, may have a substantially greater thickness than 30 Angstroms. In stoichiometric metal oxide layers, the desired properties of the laminated glazing, namely no reduction or only a negligibly small reduction in the light transmission and also no change in color in transmission or in reflection by the bond-improving layer, are found in layers up to a thickness of approximately 100 Angstroms depending upon the type of metal.

Good properties with respect to bond strength improvement and desired optical properties of the laminated glazing can be achieved if the bond-improving layer is made of titanium, nickel, an alloy of nickel and chromium, or of an oxide of one of these metals. Especially favorable results are achieved if the bond-improving layer is made of tantalum or tantalum oxide. Alloys of the aforementioned metals or mixtures of their oxides may also be used.

BRIEF DESCRIPTION OF THE DRAWING

These and other objects, features and advantages of the present invention will be more fully described with the following detailed description of the preferred embodiment in which the drawing depicts the cross-section of an automobile windscreen formed according to the invention.

DETAILED DESCRIPTION OF A PREFERRED EMBODIMENT

As shown in the drawing, an automobile windscreen of the present invention comprises first and second glass panes 1 and 4 with a layered construction 2 and a thermoplastic film 3 sandwiched inbetween. One face of glass pane 1 faces the exterior of the automobile while the other is adjacent to layered construction 2. Layer 2 is positioned adjacent thermoplastic film 3 which preferably is comprised of polyvinyl butyral, and is bonded thereto. One, side of uncoated glass pane 4 is bonded to thermoplastic intermediate film 3 while the other side faces the interior of the automobile. The process of bonding the individual components to one another is well-known in the art and utilizes heat and pressure in a pressure autoclave.

The layered construction 2, which is disposed directly on the glass plate by means of cathode sputtering, illustratively consists of layer 21 of zinc oxide having a thickness of about 350 Angstroms, a layer 22 of silver having a thickness of about 80 Angstroms disposed on the zinc oxide layer 21, an anti-reflective covering layer 23 of zinc oxide having a thickness of about 350 Angstroms disposed on the silver layer, and a bond-improving layer 24 comprised of a metal or metal oxide disposed on the anti-reflective covering layer 23. The bond-improving layer is applied to the layered construction by means of cathode sputtering. If layer 24 is made of metal, it has a thickness of approximately 10 to 30 Angstroms. In contrast, if it is made of an oxide of a metal, then the layer has a thickness of approximately 10 to 100 Angstroms.

The following describes experiments utilized to test both the bond strength and the desired optical properties of differing windowscreen specimens. The measurement of the transmission through the window screen in the range of visible light was carried out with the use of commercially available measuring devices. For measuring the bond strength between the coated glass surface and the polyvinyl butyral film, the Pummel test, conventional in practice, was used. In this test, laminated glass samples are subjected to the action of a hammer weighing 300 g on the surface of the glass at a temperature of −20° Celcius. The quantity of glass crumble adhering to the polyvinyl butyral film is measured after this treatment. If no glass crumble adheres to the polyvinyl butyral film, the Pummel value is zero; if the polyvinyl butyral film is completely covered with glass crumble, the Pummel value is ten. In order to satisfy safety properties of the art, the Pummel value must be at least 4, corresponding to forty percent of the total glass pane area being covered with glass crumble.

In tests performed, the specimens were subsequently subjected to long-term radiation to determine the effect of radiation on bond strength. In each case, the bond strength was determined after radiation exposures of 100, 200, 300, and 400 hours. The radiation was carried out under "Light Stability Test No. 1" (American National Standards Institute ANSI Z 26.1a - 1980) conditions.

In all cases, the experimental panes were heatable laminated glass panes having a basic layered construction: Zinc Oxide-Silver-Zinc Oxide; the following experimental glass panes were, with the exception of the reference example, provided with a bond-improving coating.

REFERENCE EXAMPLE

For comparison purposes, a laminated glass specimen without a bond-improving layer was tested. The reference specimen had a transmission degree of 77%. The Pummel value for the boundary surface between the coated glass pane and the polyvinyl butyral film had a value of 3 before the radiation exposure. After a radiation exposure of only 100 hours, the Pummel value had fallen to approximately 1 and this value remained substantially unchanged up to a radiation exposure of 400 hours. The Pummel value on the other side of the polyvinyl butyral film, that is to say at the boundary layer between the polyvinyl butyral film and the uncoated glass surface, was approximately 8 before radiation. Even after a radiation period of 400 hours, the Pummel value had not fallen significantly below 8.

EXAMPLE 1

A specimen pane was tested having a bond-improving coating, approximately 20 Angstroms thick made of metallic titanium. The degree of transmission of the specimen pane was 77%. The Pummel value before the commencement of radiation was approximately 8, and decreased to approximately 7 after a radiation exposure of 200 hours, and decreased to approximately 6 after a radiation exposure of 400 hours.

EXAMPLE 2

A specimen pane was tested having a coating of titanium oxide approximately 40 Angstroms thick. The titanium oxide layer was sputtered onto the pane by reactive cathode sputtering of a titanium target in a high vacuum possessing a slight partial pressure of oxygen. Again, the degree of transmission was 77%. The Pummel value was approximately 7.5 before radiation, and decreased to approximately 6.5 after a radiation time of 200 hours, and approximately 5 after a radiation time of 400 hours.

EXAMPLE 3

A specimen pane was provided with a substantially metallic nickel-chromium coating, which was produced by cathode sputtering of a target of a nickel-chromium alloy comprising 80% nickel and 20% chromium. The thickness of the nickel-chromium layer was about 15 Angstroms. The degree of transmission was 75.4%. The Pummel value before radiation was approximately 4; and during the course of radiation, exposure decreased slightly below this value.

EXAMPLE 4

A specimen pane was tested having a coating of metallic tantalum approximately 15 Angstroms thick. Light transmission was about 77% and had a tendency to increase slightly. The Pummel value before the commencement of radiation was 8, and this Pummel value remained unchanged during a radiation exposure of 400 hours.

EXAMPLE 5

A specimen pane was produced by means of reactive cathode sputtering using a metallic tantalum target to produce a bond-improving layer of tantalum oxide approximately 50 Angstroms thick. In comparison with the reference specimen, the degree of transmission tended to increase slightly in this specimen. Also, the bond strength established by the Pummel test demonstrated an extraordinarily good bond with Pummel values of 8 even after a radiation exposure of 400 hours.

While it is apparent that the invention herein disclosed fulfills the objects above stated, it will be appreciated that numerous embodiments and modifications may be devised by those skilled in the art, and it is intended that the appended claims cover all such modifications and embodiments as fall within the spirit and scope of the present invention.

What is claimed is:

1. A laminated glazing system comprising:
   first and second glass panes, one of said glass panes bearing a layered construction, wherein said layered construction is bonded to the other glass pane by a polyvinyl butyral film,
   said layered construction comprising a silver layer, an anti-reflective layer of ZnO disposed on said silver layer, and a bonding layer disposed on said anti-reflective layer and contacting said film,
   said bonding layer comprising at least one metal from groups IV, V, or VIII of the periodic system or an alloy or oxide of these metals.

2. The laminated glazing system of claim 1 further comprising a metallic layer or substoichiometric metallic oxide layer positioned between said anti-reflective covering layer and said silver layer.

3. The laminated glazing system of claim 1 wherein said layered construction is applied by means of cathode sputtering.

4. The laminated glazing system of claim 1 wherein the bonding layer is a metal oxide and has a thickness of between about 10 and 100 Angstroms.

5. The laminated glazing system of claim 1 wherein the bonding layer is a metal or alloy and has a thickness of between about 10 and 30 Angstroms.

6. The laminated glazing system of claim 5, wherein the bonding layer comprises tantalum, titanium, nickel, or a nickel-chromium alloy.

7. The laminated glazing system of claim 1 wherein the bonding layer comprises titanium, nickel, nickel-chromium, tantalum, or an oxide of these metals.

8. The laminated glazing system of claim 1, wherein the bonding layer is titanium oxide.

9. A laminated glazing system comprising:
first and second glass panes, one of said glass panes bearing a layered construction, wherein said layered construction is bonded to the other glass pane by a polyvinyl butyral film,
said layered construction comprising a conductive silver layer, an anti-reflective layer of ZnO disposed on said conductive silver layer, and a bonding layer disposed on said anti-reflective layer and contacting said film,
said bonding layer comprising at least one metal from group VIII of the periodic system in the form of an oxide.

10. The laminated glazing system of claim 9 wherein the bonding layer comprises an oxide of nickel.

11. The laminated glazing system of claim 9 wherein the thickness of said bonding layer is between 10 and 100 Angstroms.

12. The laminated glazing system of claim 9 which further comprises a metallic layer or a substoichiometric metallic oxide layer positioned between said antireflective layer and said silver layer.

* * * * *